United States Patent [19]
Ozga

[11] 4,097,920
[45] Jun. 27, 1978

[54] HARDWARE CONTROL FOR REPEATING PROGRAM LOOPS IN ELECTRONIC COMPUTERS

[75] Inventor: Stanley Edward Ozga, Willingboro, N.J.

[73] Assignee: RCA Corporation, New York, N.Y.

[21] Appl. No.: 749,971

[22] Filed: Dec. 13, 1976

[51] Int. Cl.² .............................................. G06F 9/06
[52] U.S. Cl. ................................................. 364/200
[58] Field of Search ............................... 364/200, 900

[56] References Cited

U.S. PATENT DOCUMENTS

| | | | |
|---|---|---|---|
| 3,297,999 | 1/1967 | Shimabukuro | 364/200 |
| 3,328,763 | 6/1967 | Rathbun | 364/200 |
| 3,366,929 | 1/1968 | Mullery | 364/200 |
| 3,546,677 | 12/1970 | Barton | 364/200 |
| 3,593,306 | 7/1971 | Toy | 364/200 |
| 3,593,313 | 7/1971 | Tomazewski | 364/200 |
| 3,736,567 | 5/1973 | Lotan | 364/200 |
| 3,868,644 | 2/1975 | Healey | 364/200 |
| 3,988,717 | 10/1976 | Kisylia | 364/200 |

*Primary Examiner*—James D. Thomas
*Attorney, Agent, or Firm*—H. Christoffersen; Samuel Cohen; Carl M. Wright

[57] ABSTRACT

Push-pop stack and counters added to automatic processor's program addressing and execution logic. A certain instruction, typically a load counter instruction, "pushes" the contents of the program counter (instruction address register) onto the stack (that is, loads the stack in the direction from top toward bottom). Other certain instructions, such as decrement and test counter, or special bits in all instructions decrement the last loaded counter's value by one and test for zero counter value. If the test is false, the instruction address register's contents are replaced by the top stack word and the program loop is repeated. The program loop is thus repeated until the test is true. When the test is true, the program counter addresses the next instruction in sequence and the stack is popped (its contents are shifted in the direction from the bottom toward the top of the stack), the top stack word being lost since the program loop will not be repeated. The counter pointer may be controlled by the program or may be automatic, i.e., under hardware control.

3 Claims, 7 Drawing Figures

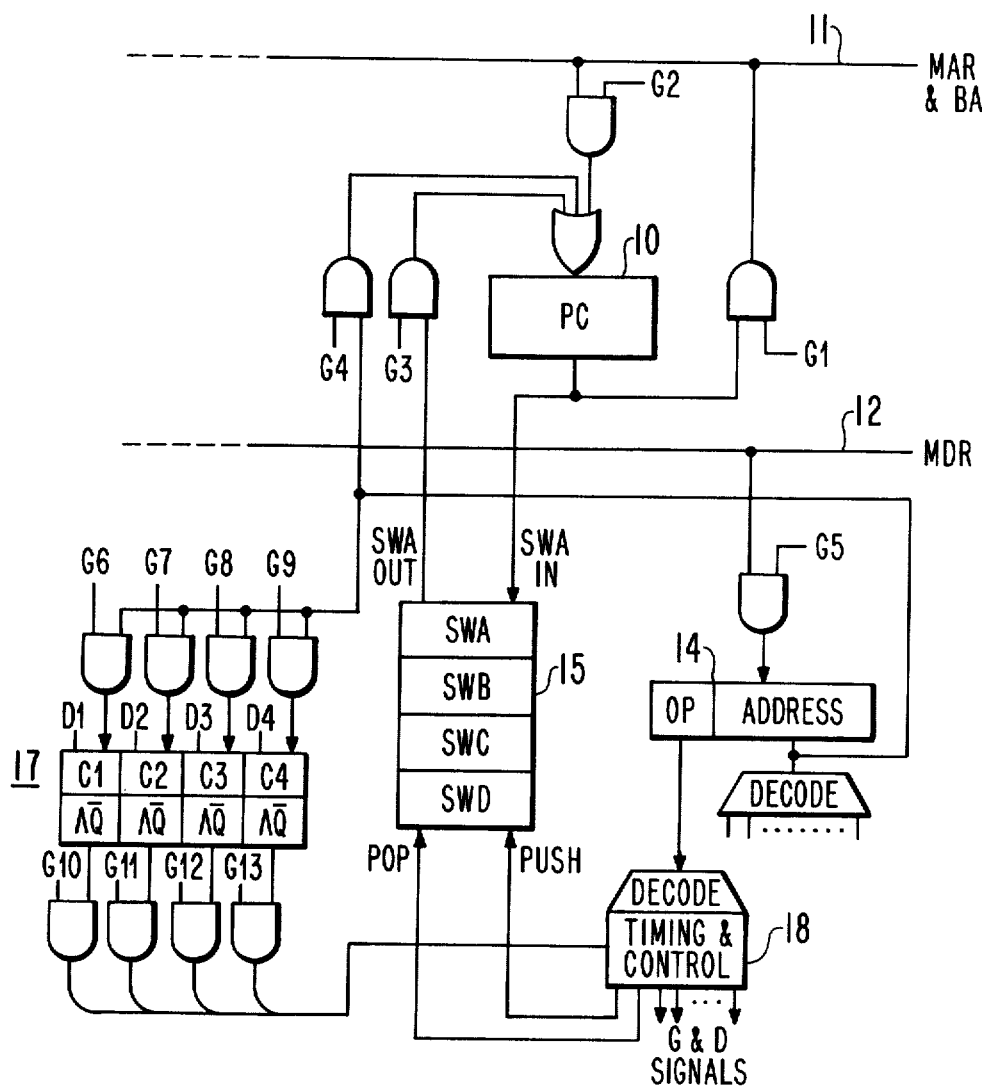
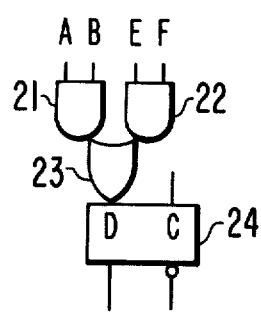
Fig. 2 (a)
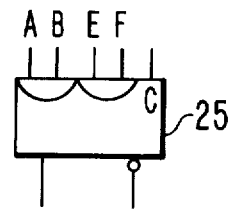
Fig. 2 (b)
Fig. 1

HARDWARE CONTROL FOR REPEATING PROGRAM LOOPS IN ELECTRONIC COMPUTERS

The Government has rights in the invention pursuant to Contract No. DAAB07-75-C-1314, awarded by the Department of the Army.

This invention relates to program control of electronic computers, electronic data processing systems, and other similar programmed instruction devices.

Most electronic computers or data processor systems have some need for performing loops of instructions. Any iterative technique requires looping. Matrix manipulations, such as when solving simultaneous equations, require several loops or repeated paths of instructions during program execution. Table searching is another example; a group of memory locations may require sequential acquisition using the same set of instructions for testing criteria.

Program loops must usually be programmed as part of the software. Instructions are used to set up the number of loop iterations and other instructions, inserted at the right places in the program flow, test the iteration values, performing branch instructions based on the tested values. The iteration value may be decremented or incremented each time the loop path is transited. If the total number of loop iterations is stored in the counter initially, then the counter contents are decremented each loop transition and the test is made for zero. If the counter is initially set to zero, it is incremented each loop transit and the test is made for the total desired number of loop iterations.

Most modern computers require at least two instructions for loop control after the iteration value has been loaded in a suitable memory location or general purpose register. One instruction is used to decrement the value in the register at the end of the loop and set condition codes based on whether the result of the decrementing was positive, negative or zero. A branch instruction, commonly called a conditional branch, determines whether to return to the beginning of the loop based on the condition code after the decrement instruction. Other machines, such as the RCA 501, have a tally instruction which performs the count decrement, test, and branch. Such instructions reduce to one the number of instructions required to perform program loops.

The number of total loop transits is usually quite numerous. The number is increased by nested loops, which are loops that are performed within other loops. In handling multidimensional arrays, there is usually at least one nested loop for each array dimension. Sometimes there are more loops than dimensions as will be seen in an example below. In a three-dimensional matrix 10 words wide, a thousand iterations are required to operate on each cell in the array. Operations such as setting the array to zero initial values can be quite expensive in terms of overhead instructions when processing speed is important. Multiplying two 10-by-10 matrices also requires a thousand loop iterations. Multiplying two 20-by-20 matrices requires a total of 8000 loop transits.

By eliminating all overhead instructions, even the one instruction referred to above, processing speed can be greatly improved. The elimination of loop control instructions is accomplished by special hardware in the system described herein.

In a system embodying the invention, the means for executing programmed instructions has an instruction addressing means which stores the memory address of the next instruction to be executed and an instruction execution register means which stores the instruction being executed. Control and timing means provide control signals in response to signals which include signals from the instruction execution register means. A stack register means is provided for storing addresses transferred from the instruction addressing means in response to instructions being executed. The stack register means produces output signals representing the most recently stored instruction address. When certain other instructions are executed, the most recently stored instruction value address in the stack is returned to the instruction addressing register.

In the drawings:

FIG. 1 is a logic diagram of a portion of an electronic computer or data processing system embodying the invention;

FIGS. 2(a) and 2(b) are illustrations of a logic device used in the explanation of the preferred embodiment of the invention;

Figure 3:
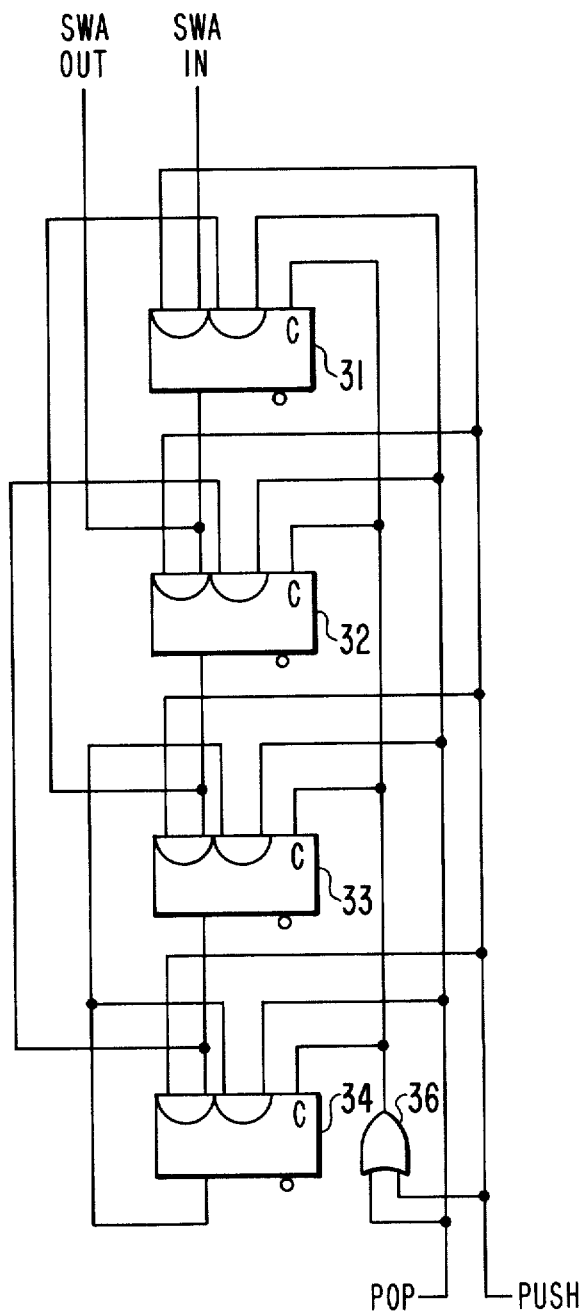
FIG. 3 is a logic diagram of one column of a four-register LIFO stack.

In FIG. 1, a program counter 10, also called an instruction address register, is coupled to receive addresses from a memory address bus 11, a memory data bus 12, or a stack register 15. An instruction register 14 receives information from the memory data bus 12 which is coupled to a memory data register (not shown). The instruction register 14, sometimes called an instruction execution register, is divided into two parts. The first part contains the operation code and the second part contains the operation address or literal of the instruction being executed. The instruction register 14, program counter 10, memory address bus 11, and the memory data bus 12, together with a control network 18, are present in some form in electronic data processors and electronic computers.

For purposes of illustration, the invention will be described as used in a "one-address" type computer. In such a computer, each instruction comprises an operation code which describes the operation to be performed and an address code which represents the memory address of an operand or a literal. A literal is a binary word used as an immediate operand, a constant value, or a special operation designator. In instructions requiring two operands, such as the arithmetic instructions, the binary number in an accumulator is the implied second operand.

Normal operation of the system is as follows. The address in the program counter 10 is gated to the memory address bus 11 by a gating signal G1. The address is coupled to the address register of a memory and a bus adder. The purpose of the bus adder is to increment or decrement the contents of the program counter by a given value. Usually the program counter's value is incremented so as to address the next instruction in sequence. For an example of a bus adder, see U.S. Pat. No. 3,372,382 to Newman, assigned to the same assignee as the present invention. The modified value from the bus adder is gated back into the program counter 10 from the address bus 11 by a gating signal G2. The data stored at the location addressed by the program counter 10 are placed in the memory data register and on the memory data bus 12 and stored in the instruction execution register 14 by a control signal G5. The operation code in the instruction execution register 14 is decoded and supplies suitable control signals from the control network 18.

The sequence of events described above is usually referred to as the fetch cycle or statisizing the instruction. This is followed by an execution cycle or cycles. The configuration of the control network 18 depends on the instruction repertoire of the particular computer system. In addition to the operation code, there are several other input signals to the control network 18 not explicitly shown. For example, a previous result signal indicating that the value in the accumulator is negative, zero, or positive is supplied to the control network 18. A conditional branch instruction indicates a test or tests to be performed. If the test result is true, the address portion of the instruction execution register 14 is gated into the program counter 10 by a control signal G4. Thus, if the operation code indicates that there is to be an program branch to the memory location given by the address portion of the instruction if the contents of the accumulator are zero, the combination of the signal from the operation decoder and the state of the previous result zero signal produce the control signal G4.

To facilitate the execution of loop instructions, a "push-pop" stack 15 and counter ensemble 17 are added to the computer logic as shown in FIG. 1. A push-pop stack refers to a stack of registers which can be pushed (transferred downward) or popped (transferred upward). Sometimes such a stack is called a last-in-first out (LIFO) register. In the push operation, the topmost register, referred to as stack word A (SWA), is set to the value of the incoming signals on the SWA input (SWA IN) line. The previous address in SWA is transferred to the second register in the stack, referred to as stack word B, (SWB), whose previous contents are transferred to the third register, referred to as stack word C (SWC). The previous contents of SWC are transferred to the fourth register, referred to as stack word D (SWD), whose previous contents are lost. The pop operation moves the contents of SWB into SWA, the contents of SWC into SWB, and the contents of SWD into SWC. The contents of SWD are not affected by this operation. The contents of SWA are provided as the output signals SWA OUT.

Before describing in detail the construction of a suitable push-pop stack, the use of a special symbol will be explained. The operation of the logic figure shown in FIG. 2(b) is the equivalent to that of the logic network shown in FIG. 2(a). That is, two pairs of input signals are applied to AND gates 21 and 22, whose output signals activate an OR gate 23. The output signal from the OR gate 23 is coupled to the D input terminal of a flip-flop 24. When a clock signal is applied to the clock terminal of the flip-flop 24, the flip-flop D will store a logical value represented by:

$$D = AB + EF;$$

that is, if A and B or E and F are true, the flip-flop 24 will be set. (According to the usual custom, the AND truth values are determined before the OR truth values.) The flip-flop 25 in FIG. 2(b) is set by the same input conditions.

FIG. 3 is a logic diagram of one column of a push-pop stack useful in the invention. There is one such column for each bit in the program counter 10 of FIG. 1. In four flip-flops 31–34, a push control signal will set the flip-flop 31 with the signal value on the SWA-IN line, set the flip-flop 32 with the value previously stored in the flip-flop 31, set the flip-flop 33 with the value previously stored in the flip-flop 32, and set the flip-flop 34 with the value previously stored in the flip-flop 33. The push command signal also activates an OR gate 36 which provides the clock signal to each of the flip-flops 31–34. A pop command signal produces the clock signal via the OR gate 36 and shifts the contents from the flip-flop 32 into the flip-flop 31, the contents from the flip-flop 33 into the flip-flop 32, the contents from the flip-flop 34 into the flip-flop 33. The output signals from the flip-flop 31 are made available as the SWA OUT signal.

Returning to FIG. 1, it is seen that the contents of the program counter 10 can be pushed onto the stack 15 by the push command and that the contents of SWA can be set into the program counter 10 by the control signal G3. The lines between the stack register 15 and the program counter 10, i.e., the signals SWA OUT and SWA IN, represent buses, each bus having a line for every bit in the program counter 10.

The counter ensemble 17 comprises four counters, each counter corresponding to a position in the register stack 15. For example, counter C1 is associated with stack word A, counter C2 with stack word B, and so on. The initial contents of each counter are set by control signals G6–G9 to the value in the address portion of the instruction execution register 14. Each counter also has a signal input for decrementing the contents of the counter and at the output of each counter is a zero detector. The zero detector is simply the ANDed reset output signals from each stage of the associated counter, or $$\prod_m \overline{Q}$$

for an $m$-stage counter. The zero output signal from each counter is gated to the timing and control network 18 by control signals G10–G13.

Figure 4:
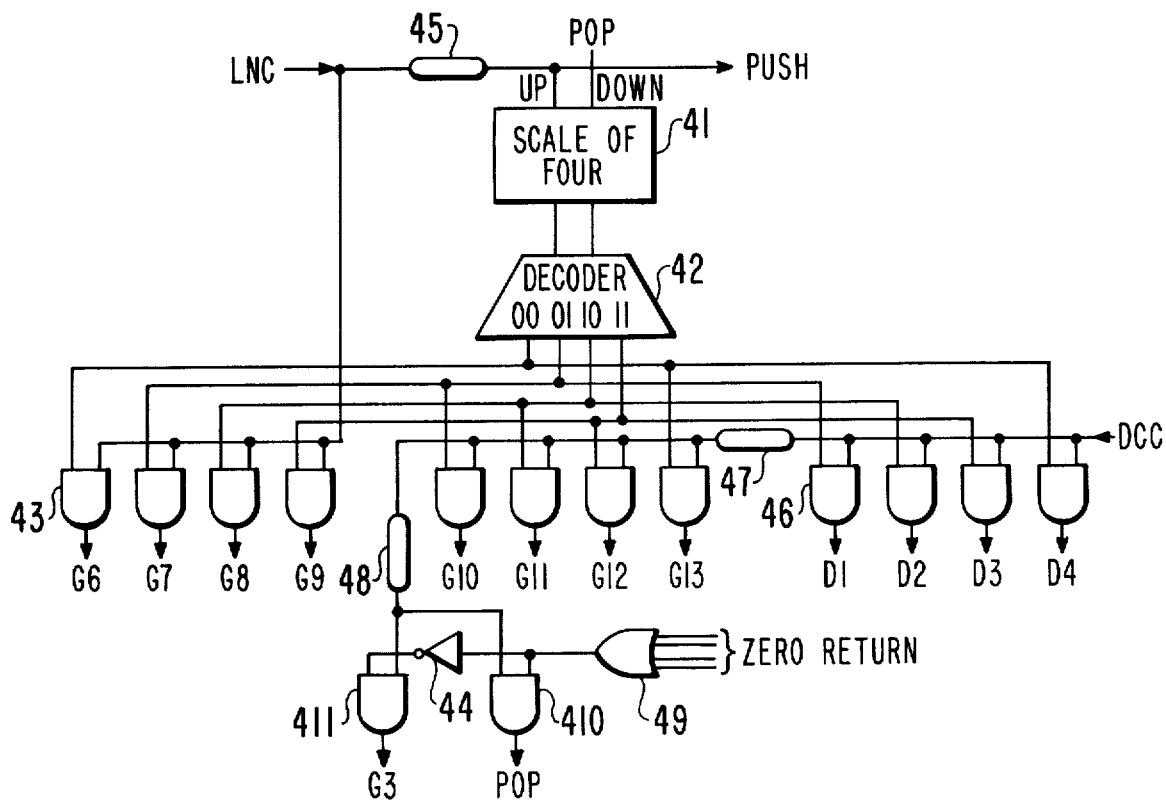
FIG. 4 is a logic diagram of a portion of the control circuit useful in the system embodying the invention.

Although it is feasible to provide instructions to set each counter in the ensemble 17 individually under program control, automatic control of the counter is preferable and accomplishes the same result. The circuit of FIG. 4 is a portion of the timing and control logic suitable for use as automatic counter pointer logic. A scale-of-four counter 41, which can be implemented as a two-stage ripple up-down counter as is well known in the art, provides input signals to a one-out-of-four decoder 42. The output lines from the decoder 42 indicate which counter in the ensemble is the current counter. An instruction, such as Load Next Counter (LNC), can be used to push the stack automatically and to load the counter for the next loop. The scale-of-four counter 41 is initially set to the value 0 (binary $00_2$) so that an LNC instruction supplies a control signal G6 from an AND gate 43. In FIG. 1, the control signal G6 gates the address portion of the instruction in the instruction execution register 14 into counter 1. In an LNC instruction, the instruction address is a value indicating the number of loop iterations to be made beginning at the address which is pushed onto the stack by the LNC instruction. Since the program counter 10 has been incremented, the first loop instruction will be the instruction following the LNC instruction. In FIG. 4, a delay element 45 permits the counter to be loaded before the scale-of-four counter 41 is incremented to the next count, in this example to $01_2$, corresponding to the counter C2 in the ensemble. The delayed LNC signal also provides a push command signal to the stack register 15 (FIG. 1).

Another instruction, such as Decrement and Test Current Counter (DCC), primes a set of AND gates in FIG. 4 to decrement the current counter. The counter to be decremented, i.e., the current counter, is always the counter which was last loaded. Therefore, the gating is arranged so that the register indicated by the scale-of-four counter minus one is decremented by the instruction. In this example, since counter C1 (corresponding to counter value $00_2$) was loaded, the decrement D1 signal is provided by the AND gate 46 which is primed by the $01_2$ output signal from the decoder 42. A delay element 47 provides an interval of time for the counter value to stabilize after the decrement signal, and then gates the zero output signal from the zero detectors (with one of the control signals G10–G13) to the timing and control logic 18. The control signal G10 corresponds to the counter just decremented. An OR gate 49 receives the zero detectors' output signals which provides a logical one output signal from the OR gate 49 if the tested counter has a zero value.

After another short interval provided by the delay element 48 to allow for gate propagation delays, the AND gates 410 and 411 are primed by the command signal DCC. If the tested counter contains zero, the AND gate 410 is enabled and the stack is popped. The fetch cycle then causes the next instruction in sequence to be fetched as indicated by the contents of the program counter 10 in FIG. 1. If the contents of the tested counter are not zero, the logical zero output signal from the OR gate 49 is inverted by an inverter 44 to enable the AND gate 411. The output signal from the AND gate 411 is the control signal G3 which, as shown in FIG. 1, gates stack word A into the program counter 10. This causes the program to return to the starting point of the current loop.

It can be seen from the circuit just described that if a second loop is nested inside the first loop just described, an LNC instruction will set the number of iterations of the nested loop into the counter C2 with the control signal G7. The next DCC instruction will decrement and test the counter C2, performing the nested loop instructions each time, until its value is zero at which time the pop instruction decrements the scale-of-four counter 41 to point to the counter C1.

Although described above in terms of the special instruction decrement and test counter (DCC) instruction, the DCC instruction is not actually required. A special field or bit in each instruction word can be used to indicate the decrement and test counter function. For example, an extra bit in every instruction word can be provided such that when it is set, it generates the DCC signal after the instruction has been executed so that at the completion of the instruction, decrement, test and subsequent transfer can be accomplished without the use of another instruction.

Figure 5:
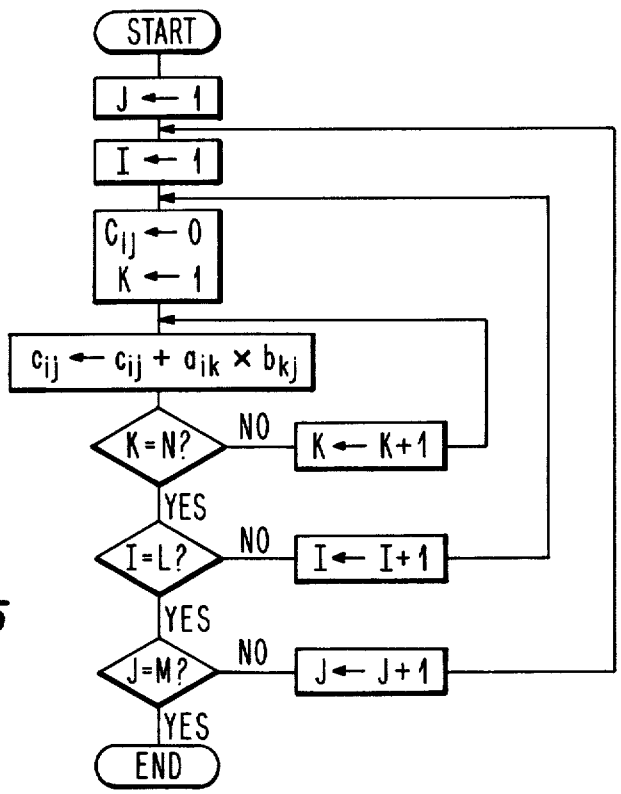
FIG. 5 is a flowchart showing a typical software matrix multiplication.

As an example of the use of nested loops, FIG. 5 illustrates how a particular matrix multiplication might be accomplished in software. Letting L represent the number of rows in matrix A and M the number of columns in matrix B, the output matrix will have the dimensions of M rows by L columns. The constant N represents the number of columns in matrix A and the number of rows in matrix B, since these must be equal in a matrix multiply. Letting C indicate the result matrix, each element of the result matrix is given by:

$$c_{ij} = \sum_{k=1}^{N} a_{ik} \times b_{kj} \quad \begin{array}{l} i = 1,2\ldots, L \text{ and} \\ j = 1,2,\ldots, M. \end{array}$$

In the algorithm flowcharted in FIG. 5, J is initially set to the value one. Next, the value of I is set to one. Then the initial value of the result element is set to zero and K is set to the value of one. Next, the result element $c_{ij}$ is incremented by adding to it the product of the elements $a_{ik} \times b_{kj}$, after which K is tested to see if it is equal to N. If not, K is incremented by one and the incrementation of the result element is repeated but with different $a_{ik}$ and $b_{kj}$ elements because of the change in K. When the value of K reaches N, the value of I is tested to see if it equals L. If not, I is incremented by one, the new result element $c_{ij}$ is set to zero, and the value of K again set to one. Using the updated value of I, the result element is incremented for each value of K in the inside nested loop. When I reaches its maximum value L, J is tested for its maximum value M. If not equal to M, J is incremented by one, I is then set to one again and the inner two nested loops repeated for each value of J. When J reaches the value of M, the matrix multiplication is complete. Since K assumes the value 1 through N for each value of I, then the inside two loops represent the total number of iterations L × N which are performed once for each value of J from one through M. Therefore, the number of loop iterations in FIG. 5 is equal to the product of M × N × L.

Figure 6:
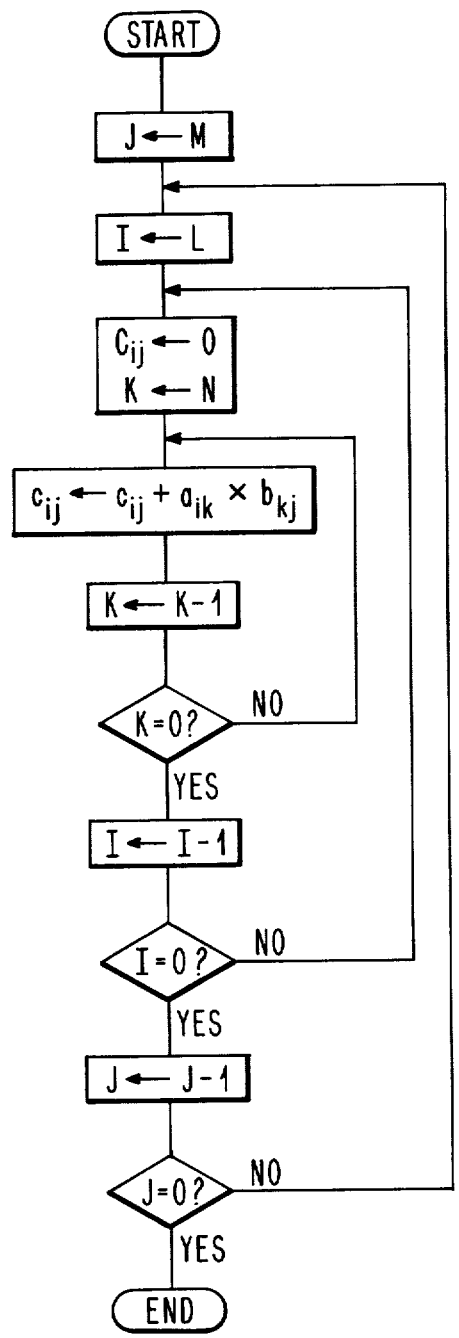
FIG. 6 is a flowchart of a matrix multiplication according to the hardware of the invention.

A variation of this algorithm is shown in FIG. 6 to indicate the function of the hardware shown in FIG. 1. The first instruction, i.e., an LNC instruction, stores the value of M and the second LNC instruction sets the value of L. In this case, the first LNC instruction, loads the first counter C1 with the value of M as specified by the address portion of the instruction. This causes the address of the next instruction which is in the program counter 10 to be pushed onto the stack as stack word A. The next instruction, also an LNC instruction, loads the value L into the second counter C2, and pushes the contents of the program counter 10 onto the stack. The instruction address pushed onto the stack by the second LNC instruction is the location of an instruction which sets the value of the register or memory location storing $c_{ij}$ to zero. The next instruction sets the third counter C3 to the value N and causes the address of the next instruction from the program counter 10 to be pushed onto the stack. This next instruction multiplies $a_{ik} \times b_{kj}$. The next instruction adds the resulting product to the present value of $c_{ij}$ which is replaced by the sum. The add instruction has, for example, the last bit set to perform the DCC function indicated by K being replaced by the value K-1 and a test made for K equal to zero. If K is not zero, stack word A, which locates the multiply $(a_{ik} \times b_{kj})$ instruction, is gated from stack word A into the program counter 10. Thus, the multiply and add instructions continue until the third counter is decremented to zero. When K equals zero, the stack is popped and the I value is then tested in the next instruction. Since the I count in counter C2 is to be tested next, a NOOP instruction can be used with the last bit set to cause the current counter, now counter C2, to be tested. The NOOP instruction is an instruction for which no operation is performed; it is merely staticized. Since the stack was popped, the next instruction gated from stack word A to the program counter 10 (FIG. 1) will be the instruction which sets the result element $c_{ij}$ to zero. That instruction is followed by the LNC instruction to set the third counter C3 to the value of N. This again pushes the stack and the inner loop is performed as described above until the value of I is equal to zero. Another NOOP with the last bit set to perform the DCC instruction tests the first counter C1 for a value of zero. If not zero, stack word A which now contains the instruction that sets the second counter C2 to the value of L is placed in the program counter 10. The stack is pushed and the inner two loops are repeated. When the value of J reaches zero, the stack is popped and the program continues.

Another bit can be added to each instruction to indicate that additional counters are to be tested after the current counter is equal to zero. For four stack words and four counters, four bits can be added to indicate that if the current counter is zero, the stack is popped and that the next counter is to be decremented and tested, and so on. This would be useful as seen from the example of the algorithm set forth by the flow chart of FIG. 6.

Various modifications to the systems and circuits described and illustrated to explain the concepts and modes of practicing the invention can be made by those of ordinary skill in the art within the principles or scope of the invention as expressed in the appended claims.

What is claimed is:

1. In a system for executing loops of programmed instructions, said system including instruction addressing means for storing the memory address of a next instruction to be executed, instruction execution register means having an operation part and at least one address part for storing signals representing an instruction being executed, and control means including timing means for producing control signals in response to signals including signals from the operation part of said instruction execution register means, the improvement comprising:

stack register means coupled to receive the contents of the instruction addressing means for storing addresses from said instruction addressing means in response to said control signals generated by certain non-branching instructions in said instruction execution register means, said stack register means including output means for providing signals representing the most recent instruction address stored; and gating means responsive to said control signals generated by other certain instructions in said instruction execution register means and to said stack register output means for gating signals from said stack register output means into said instruction addressing means.

2. The invention claimed in claim 1 further comprising:

counter means for storing a value specified by said certain instructions;

means for coupling said counter means to receive said address part of the instruction execution register means during the execution of said certain instructions;

decrementing means responsive to control signals generated by said other certain instructions for decrementing the value stored in the counters;

zero detect means responsive to said counter means value and to said other certain instructions for producing an output signal when the value stored in said counter has a value other than zero; and means coupling said zero detect means output signal to said control means for generating control signals to said gating means.

3. The invention as claimed in claim 2 wherein said stack register means comprises a push-pop stack means for storing a plurality of address words, said counter means comprises a plurality of counter means, each of said counter means associated with a particular one of said address words stored in said push-pop stack means, and said control means includes pointer means responsive to said certain instructions for providing control signals to said counter means in sequence.

* * * * *

UNITED STATES PATENT OFFICE
CERTIFICATE OF CORRECTION

PATENT NO. : 4,097,920
DATED : June 27, 1978
INVENTOR(S) : Stanley Edward Ozga

It is certified that error appears in the above-identified patent and that said Letters Patent are hereby corrected as shown below:

In the Abstract, line 11, after "the" insert --address in the--.

Signed and Sealed this

Nineteenth Day of December 1978

[SEAL]

Attest:

RUTH C. MASON
Attesting Officer

DONALD W. BANNER
Commissioner of Patents and Trademarks